United States Patent
Krah et al.

(10) Patent No.: US 10,969,917 B2
(45) Date of Patent: Apr. 6, 2021

(54) AUTO SCANNING FOR MULTIPLE FREQUENCY STIMULATION MULTI-TOUCH SENSOR PANELS

(75) Inventors: Christoph Horst Krah, Los Altos, CA (US); Steve Porter Hotelling, San Jose, CA (US)

(73) Assignee: Apple Inc., Cupertino, CA (US)

( * ) Notice: Subject to any disclaimer, the term of this patent is extended or adjusted under 35 U.S.C. 154(b) by 977 days.

(21) Appl. No.: 12/022,572

(22) Filed: Jan. 30, 2008

(65) Prior Publication Data
US 2009/0189867 A1    Jul. 30, 2009

(51) Int. Cl.
*G06F 3/041* (2006.01)
*G06F 3/044* (2006.01)

(52) U.S. Cl.
CPC .................. *G06F 3/0446* (2019.05)

(58) Field of Classification Search
CPC .............................. G06F 3/0416; G06F 3/0418
USPC .................................................. 345/173–178
See application file for complete search history.

(56) References Cited

U.S. PATENT DOCUMENTS

| | | | |
|---|---|---|---|
| 4,899,138 A | 2/1990 | Araki et al. | |
| 5,396,443 A | 3/1995 | Mese et al. | |
| 5,483,261 A | 1/1996 | Yasutake | |
| 5,488,204 A | 1/1996 | Mead et al. | |
| 5,553,296 A | 9/1996 | Forrest et al. | |
| 5,825,352 A | 10/1998 | Bisset et al. | |
| 5,831,593 A | 11/1998 | Rutledge | |
| 5,835,079 A | 11/1998 | Shieh | |
| 5,880,411 A | 3/1999 | Gillespie et al. | |
| 6,054,979 A | 4/2000 | Sellers | |
| 6,188,391 B1 | 2/2001 | Seely et al. | |
| 6,236,386 B1 | 5/2001 | Watanabe | |
| 6,239,788 B1 | 5/2001 | Nohno et al. | |

(Continued)

FOREIGN PATENT DOCUMENTS

| | | |
|---|---|---|
| CA | 2318815 A1 | 7/1999 |
| CN | 1367424 A | 9/2002 |

(Continued)

OTHER PUBLICATIONS

Chinese Search Report dated Dec. 17, 2010, for CN Application No. 200820006265.2, filed Jan. 3, 2007, with English Translation, 10 pages.

(Continued)

*Primary Examiner* — Christopher E Leiby
(74) *Attorney, Agent, or Firm* — Kubota & Basol LLP

(57) ABSTRACT

The use of multiple stimulation frequencies and phases is disclosed to detect touch events on a touch sensor panel in a low-power state. Simultaneously during every frame, a number of rows of the touch sensor panel can be driven with a positive phase of one or more stimulation signals, and the same number of different rows can be driven with the anti-phase of those same stimulation signals. Because the same number of rows are stimulated with the in-phase and anti-phase components of the one or more stimulation signals, the resulting charges injected into a given column cancel each other out. However, a touch event will create an imbalance, and a non-zero charge will be detected. The detection of the touch event can then trigger the system to wake up, activate a panel processor, and perform a full panel scan, where the location of the touch event can be identified.

28 Claims, 12 Drawing Sheets

(56) References Cited

U.S. PATENT DOCUMENTS

| | | |
|---|---|---|
| 6,310,610 B1 | 10/2001 | Beaton et al. |
| 6,323,846 B1 | 11/2001 | Westerman et al. |
| 6,417,845 B1 | 7/2002 | Chen et al. |
| 6,583,676 B2 | 6/2003 | Krah |
| 6,661,239 B1 | 12/2003 | Ozick |
| 6,690,387 B2 | 2/2004 | Zimmerman et al. |
| 6,856,259 B1 | 2/2005 | Sharp |
| 6,888,536 B2 | 5/2005 | Westerman et al. |
| 6,977,646 B1 | 12/2005 | Hauck et al. |
| 7,015,894 B2 | 3/2006 | Morohoshi |
| 7,180,477 B2 | 2/2007 | Howell |
| 7,184,064 B2 | 2/2007 | Zimmerman et al. |
| 7,254,775 B2 | 8/2007 | Geaghan et al. |
| 7,663,607 B2 | 2/2010 | Hotelling et al. |
| 7,714,846 B1 * | 5/2010 | Gray ............................. 345/173 |
| 7,737,957 B2 * | 6/2010 | Lee et al. ....................... 345/173 |
| 7,825,912 B2 | 11/2010 | Lee |
| 8,049,732 B2 | 11/2011 | Hotelling et al. |
| 8,085,247 B2 | 12/2011 | Wilson |
| 8,094,128 B2 | 1/2012 | Vu et al. |
| 8,125,456 B2 | 2/2012 | Krah et al. |
| 8,310,472 B2 | 11/2012 | Vu et al. |
| 8,390,588 B2 | 3/2013 | Vu et al. |
| 8,471,837 B2 | 6/2013 | Vu et al. |
| 8,479,122 B2 | 7/2013 | Hotelling et al. |
| 8,542,208 B2 | 9/2013 | Krah et al. |
| 8,823,660 B2 | 9/2014 | Krah et al. |
| 8,836,656 B2 | 9/2014 | Vu et al. |
| 9,063,601 B2 | 6/2015 | Vu et al. |
| 9,383,843 B2 | 7/2016 | Krah et al. |
| 2003/0107557 A1 | 6/2003 | Liebenow et al. |
| 2004/0001048 A1 | 1/2004 | Kraus et al. |
| 2004/0056845 A1 * | 3/2004 | Harkcom ................ G06F 3/044 345/173 |
| 2004/0060986 A1 | 4/2004 | Bean et al. |
| 2004/0087840 A1 | 5/2004 | Main |
| 2005/0078093 A1 | 4/2005 | Peterson et al. |
| 2005/0104867 A1 | 5/2005 | Westerman et al. |
| 2005/0144524 A1 | 6/2005 | Bonaccio et al. |
| 2005/0146511 A1 | 7/2005 | Hill et al. |
| 2005/0180083 A1 | 8/2005 | Takahara et al. |
| 2006/0026521 A1 | 2/2006 | Hotelling et al. |
| 2006/0092143 A1 | 5/2006 | Kasai et al. |
| 2006/0097991 A1 | 5/2006 | Hotelling et al. |
| 2006/0114247 A1 | 6/2006 | Brown |
| 2006/0139340 A1 | 6/2006 | Geaghan |
| 2006/0197753 A1 | 9/2006 | Hotelling |
| 2006/0202969 A1 | 9/2006 | Hauck |
| 2006/0238518 A1 | 10/2006 | Westerman et al. |
| 2006/0238519 A1 | 10/2006 | Westerman et al. |
| 2006/0238520 A1 | 10/2006 | Westerman et al. |
| 2006/0274792 A1 | 12/2006 | Abhishek et al. |
| 2006/0278444 A1 | 12/2006 | Binstead |
| 2006/0284857 A1 | 12/2006 | Oh |
| 2007/0035528 A1 | 2/2007 | Hodge |
| 2007/0047738 A1 | 3/2007 | Ballantyne et al. |
| 2007/0063991 A1 | 3/2007 | Lee et al. |
| 2007/0109274 A1 * | 5/2007 | Reynolds ...................... 345/173 |
| 2007/0236478 A1 | 10/2007 | Geaghan et al. |
| 2007/0273660 A1 | 11/2007 | XiaoPing |
| 2008/0012835 A1 | 1/2008 | Rimon et al. |
| 2008/0153418 A1 | 6/2008 | Melanson |
| 2008/0157782 A1 | 7/2008 | Krah |
| 2008/0157882 A1 | 7/2008 | Krah |
| 2008/0158172 A1 | 7/2008 | Hotelling et al. |
| 2008/0158177 A1 | 7/2008 | Wilson et al. |
| 2008/0162996 A1 | 7/2008 | Krah et al. |
| 2008/0162997 A1 | 7/2008 | Vu et al. |
| 2008/0309625 A1 | 12/2008 | Krah et al. |
| 2009/0027360 A1 * | 1/2009 | Kwan et al. .................. 345/204 |
| 2009/0189867 A1 | 7/2009 | Krah et al. |
| 2010/0164898 A1 | 7/2010 | Vu et al. |
| 2010/0173680 A1 | 7/2010 | Vu et al. |
| 2010/0188356 A1 | 7/2010 | Vu et al. |
| 2012/0098778 A1 | 4/2012 | Vu et al. |
| 2012/0157167 A1 | 6/2012 | Krah et al. |
| 2012/0162129 A1 | 6/2012 | Krah et al. |
| 2015/0268791 A1 | 9/2015 | Vu et al. |
| 2016/0283038 A1 | 9/2016 | Krah et al. |

FOREIGN PATENT DOCUMENTS

| | | |
|---|---|---|
| CN | 2672701 Y | 1/2005 |
| CN | 1744023 A | 3/2006 |
| CN | 1881148 A | 12/2006 |
| EP | 0 626 633 A1 | 11/1994 |
| EP | 0 626 633 B1 | 11/1994 |
| EP | 1 058 924 A1 | 12/2000 |
| GB | 24 19 950 A | 5/2006 |
| JP | 02-272617 A | 11/1990 |
| JP | 04-096816 A | 3/1992 |
| JP | 04-308916 A | 10/1992 |
| JP | 06-067793 A | 3/1994 |
| JP | 06-119090 A | 4/1994 |
| JP | 06-348374 A | 12/1994 |
| JP | 07-020963 A | 1/1995 |
| JP | 09-198186 A | 7/1997 |
| JP | 10-111749 A | 4/1998 |
| JP | 2000-163031 A | 6/2000 |
| JP | 2001-306255 A | 11/2001 |
| JP | 2002-342033 A | 11/2002 |
| JP | 2003-084907 A | 3/2003 |
| JP | 2005-092341 A | 4/2005 |
| JP | 2005-512197 A | 4/2005 |
| JP | 2007-533044 A | 11/2007 |
| TW | 524352 U | 3/2003 |
| WO | WO-2005/114369 A2 | 12/2005 |
| WO | WO-2008/085417 A2 | 7/2008 |
| WO | WO-2008/085417 A3 | 7/2008 |
| WO | WO-2008/085720 A1 | 7/2008 |

OTHER PUBLICATIONS

Non-Final Office Action dated Feb. 23, 2011, for U.S. Appl. No. 11/650,201, filed Jan. 3, 2007, six pages.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Non-Final Office Action dated May 3, 2010, for U.S. Appl. No. 11/650,201, filed Jan. 3, 2007, eight pages.

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Chinese Office Action dated Oct. 10, 2008, for CN Application No. 200820006265.2, filed Dec. 22, 2007, seven pages (with English translation.).

International Search Report dated Apr. 28, 2008, for PCT Application No. PCT/US2007/088751, filed Dec. 22, 2007, two pages.

International Search Report dated Jul. 8, 2008, for PCT Application No. PCT/US2007/026179, filed Dec. 21, 2007, two pages.

Non-Final Office Action dated Jun. 8, 2011, for U.S. Appl. No. 11/650,040, filed Jan. 3, 2007, nine pages.

Non-Final Office Action dated Jun. 20, 2011, for U.S. Appl. No. 11/650,201, filed Jan. 3, 2007, six pages.

Taiwan Search Report, for TW Patent Application No. 097100213, one page.

Notice of Allowance dated Mar. 1, 2012, for U.S. Appl. No. 12/723,437, filed Mar. 12, 2010, seven pages.

Notice of Allowance dated Nov. 25, 2011, 2011, for U.S. Appl. No. 11/650,040, filed Jan. 3, 2007, seven pages.

Non-Final Office Action dated Mar. 19, 2012, for U.S. Appl. No. 12/726,107, filed Mar. 17, 2010, eight pages.

(56) References Cited

OTHER PUBLICATIONS

Non-Final Office Action dated Mar. 21, 2012, for U.S. Appl. No. 12/726,126, filed Mar. 17, 2012, eight pages.
Supplementary European Search Report dated Feb. 21, 2012, for EP Application No. 07866002.4, seven pages.
Final Office Action dated Aug. 10, 2012, for U.S. Appl. No. 12/726,126, filed Mar. 17, 2012, five pages.
Notice of Allowance dated Jul. 9, 2012, for U.S. Appl. No. 12/726,107, filed Mar. 17, 2010, seven pages.
Non-Final Office Action dated Jan. 22, 2013, for U.S. Appl. No. 13/405,221, filed Feb. 24, 2012, seven pages.
Notice of Allowance dated Nov. 20, 2012, for U.S. Appl. No. 12/726,126, filed Mar. 17, 2010, five pages.
Final Office Action dated Feb. 24, 2014, for U.S. Appl. No. 13/340,153, filed Dec. 29, 2011, 11 pages.
Non-Final Office Action dated Jul. 5, 2013, for U.S. Appl. No. 13/340,153, filed Dec. 29, 2011, 14 pages.
Non-Final Office Action dated Sep. 6, 2013, for U.S. Appl. No. 13/343,604, filed Jan. 4, 2012, five pages.
Notice of Allowance dated Feb. 19, 2013, for U.S. Appl. No. 12/723,437, filed Mar. 12, 2010, eight pages.
Notice of Allowance dated Jun. 20, 2013, for U.S. Appl. No. 13/405,221, filed Feb. 24, 2012, six pages.
Notice of Allowance dated Apr. 22, 2014, for U.S. Appl. No. 13/343,604, filed Jan. 4, 2012, seven pages.
Notice of Allowance dated May 1, 2014, for U.S. Appl. No. 13/340,153, filed Dec. 29, 2011, 7 pages.
Non-Final Office Action dated Sep. 25, 2014, for U.S. Appl. No. 14/448,893, filed Jul. 31, 2014, six pages.
Non-Final Office Action dated Aug. 26, 2015, for U.S. Appl. No. 14/455,604, filed Aug. 8, 2014, 11 pages.
Non-Final Office Action dated Apr. 7, 2016, for U.S. Appl. No. 14/730,162, filed Jun. 3, 2015, six pages.
Notice of Allowance dated Feb. 18, 2015, for U.S. Appl. No. 14/448,893, filed Jul. 31, 2014, seven pages.
Notice of Allowance dated Mar. 15, 2016, for U.S. Appl. No. 14/455,604, filed Aug. 8, 2014, five pages.
Notice of Allowance dated Sep. 28, 2016, for U.S. Appl. No. 14/730,162, filed Jun. 3, 2015, seven pages.
Non-Final Office Action dated Jan. 31, 2017, for U.S. Appl. No. 14/730,162, filed Jun. 3, 2015, twelve pages.

\* cited by examiner

AUTO SCANNING FOR MULTIPLE FREQUENCY STIMULATION MULTI-TOUCH SENSOR PANELS

CROSS-REFERENCE TO RELATED APPLICATIONS

Embodiments of the present invention are related to U.S. patent application Ser. No. 11/650,040, entitled Multi-Touch Auto Scanning, filed on Jan. 3, 2007.

FIELD OF THE INVENTION

This relates to touch sensor panels that utilize multiple stimulation frequencies and phases to detect and localize touch events, and more particularly, to a low power auto-scan mode capable of detecting touch events during periods of touch inactivity.

BACKGROUND OF THE INVENTION

Many types of input devices are presently available for performing operations in a computing system, such as buttons or keys, mice, trackballs, touch sensor panels, joysticks, touch screens and the like. Touch screens, in particular, are becoming increasingly popular because of their ease and versatility of operation as well as their declining price. Touch screens can include a touch sensor panel, which can be a clear panel with a touch-sensitive surface, and a display device that can be positioned behind the panel so that the touch-sensitive surface can substantially cover the viewable area of the display device. Touch screens can allow a user to perform various functions by touching the touch sensor panel using a finger, stylus or other object at a location dictated by a user interface (UI) being displayed by the display device. In general, touch screens can recognize a touch event and the position of the touch event on the touch sensor panel, and the computing system can then interpret the touch event in accordance with the display appearing at the time of the touch event, and thereafter can perform one or more actions based on the touch event.

Touch sensor panels can be formed from a matrix of row and column traces, with sensors or pixels present where the rows and columns cross over each other while being separated by a dielectric material. In order to scan a touch sensor panel driven by multiple stimulation frequencies and compute an image of touch, various phases of selected low noise frequencies can be used to simultaneously stimulate the rows of the touch sensor panel, and multiple mixers can be configured to demodulate the signals received from the columns using the selected low noise frequencies. The demodulated signals from the multiple mixers can be used in calculations to determine an image of touch for the touch sensor panel at each frequency.

A concern with many touch devices is the amount of power they consume when actively scanning the touch sensor panel. The high power consumption problem may be particularly important for hand-held devices, as the limited power supply of a hand-held device can be readily consumed by actively scanning the touch sensor panel and processing those scans. These scans can be wasteful if there is no touch-activity on the panel for an extended period of time.

A possible remedy for a loss of power consumption during periods of inactivity is to shut down (i.e. turn off) the touch sensor panel or touch device. But doing so can have several disadvantages, such as consuming even more power when turning the touch sensor panel back on (particularly if the period of inactivity is not an extended period of time) and the inconvenience to the user for having to wait for the touch sensor panel to turn back on. Additionally, a user may forget to turn the touch sensor panel off, resulting in continuous active scans of the touch panel despite a lack of touch activity.

SUMMARY OF THE INVENTION

This relates to the use of multiple stimulation frequencies and phases to detect touch events on a touch sensor panel in a low-power or sleep state of expected touch inactivity, so that when a touch event is detected, the touch sensor panel can be activated or awakened into its full-power capability to thereafter detect and localize touch events.

To accomplish this, simultaneously during every frame, a number of rows of a touch sensor panel can be driven with a positive phase of one or more stimulation signals, and the same number of different rows can be driven with the anti-phase of those same stimulation signals. Some rows can be left un-stimulated, and in some embodiments the stimulation pattern can be varied in subsequent scans. Alternatively, the number of rows stimulated with the in-phase and anti-phase signals can be imbalanced, but the amplitude of the signals can be varied to once again achieve a canceling out effect. The stimulation signal can be a single frequency or a composite of multiple frequencies. Because the same number of rows are stimulated with the in-phase and anti-phase components of the one or more stimulation signals, the resulting charges injected into a given column electrode cancel each other out, and there will be virtually no charge seen at the input to each sense channel coupled to the sense columns. However, if a finger touches down over one of the stimulated rows, an imbalance will be created, and a non-zero charge will appear on the input to one or more sense channels, indicating a touch event. All of these events can have occurred with the panel processor inactive. The detection of the touch event can then trigger the system to wake up, activate the panel processor, and perform a full panel scan, where the location of the touch event can be identified.

In another embodiment, the same frequency and phase (essentially the same stimulation signal) such as the positive phase of a particular frequency can be applied to all rows in a single frame. Because the configuration is unbalanced, the charges into the charge amplifiers will be non-zero (but different) during no-touch and touch conditions, respectively. A touch can still be detected, however, because there is a detectable difference in charge coupling between the touch and no-touch conditions.

After a touch event has been detected, a "ready mode" can be entered, which is a multi-stim sequence that is performed over multiple timing sequences per individual scan to capture multi-touch data that can be used to determine the exact touch location. Only after the data is saved is the panel processor awakened.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention can be practiced. It is to be understood that other embodiments can be used and structural changes can be made without departing from the scope of the embodiments of this invention.

This relates to the use of multiple stimulation frequencies and phases to detect touch events on a touch sensor panel in a low-power or sleep state of expected touch inactivity, so that when a touch event is detected, the touch sensor panel can be activated or awakened into its full-power capability to thereafter detect and localize touch events.

Although some embodiments of this invention may be described herein in terms of mutual capacitance touch sensors, it should be understood that embodiments of this invention are not so limited, but are generally applicable to other types of touch sensors such as self capacitance touch sensors. Furthermore, although the touch sensors in the touch sensor panel may be described herein in terms of an orthogonal array of touch sensors having rows and columns, it should be understood that embodiments of this invention are not limited to orthogonal arrays, but can be generally applicable to touch sensors arranged in any number of dimensions and orientations, including diagonal, concentric circle, and three-dimensional and random orientations. In addition, the touch sensor panel described herein can be either a single-touch or a multi-touch sensor panel, the latter of which is described in Applicant's co-pending U.S. application Ser. No. 11/649,998 entitled "Proximity and Multi-Touch Sensor Detection and Demodulation," filed on Jan. 3, 2007, the contents of which are incorporated by reference herein.

Figure 1:
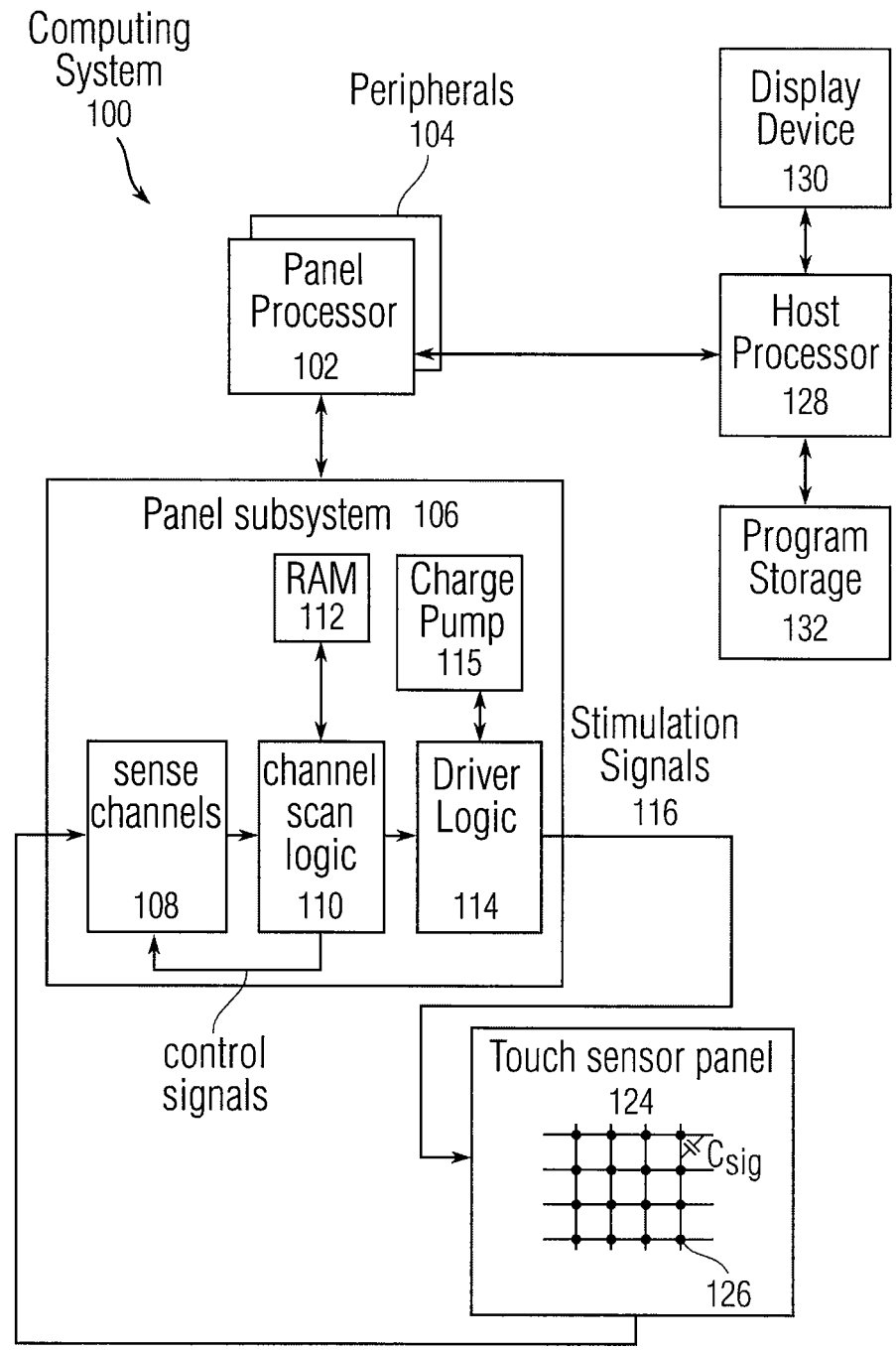
FIG. 1 illustrates exemplary computing system that can use multiple stimulation frequencies and phases to detect touch events on a touch sensor panel in a low-power or sleep state of expected touch inactivity according to embodiments of the invention.

FIG. 1 illustrates exemplary computing system 100 that can use multiple stimulation frequencies and phases to detect touch events on a touch sensor panel in a low-power or sleep state of expected touch inactivity according to embodiments of the invention. Computing system 100 can include one or more panel processors 102 and peripherals 104, and panel subsystem 106. One or more panel processors 102 can include, for example, ARM968 processors or other processors with similar functionality and capabilities. However, in other embodiments, the panel processor functionality can be implemented instead by dedicated logic, such as a state machine. Peripherals 104 can include, but are not limited to, random access memory (RAM) or other types of memory or storage, watchdog timers and the like. Panel subsystem 106 can include, but is not limited to, one or more sense channels 108, channel scan logic 110 and driver logic 114. Channel scan logic 110 can access RAM 112, autonomously read data from the sense channels and provide control for the sense channels. In addition, channel scan logic 110 can control driver logic 114 to generate stimulation signals 116 at various frequencies and phases that can be selectively applied to multiple rows of touch sensor panel 124. In some embodiments, panel subsystem 106, panel processor 102 and peripherals 104 can be integrated into a single application specific integrated circuit (ASIC).

Touch sensor panel 124 can include a capacitive sensing medium having a plurality of row traces or driving lines and a plurality of column traces or sensing lines, although other sensing media can also be used. The row and column traces can be formed from a transparent conductive medium such as Indium Tin Oxide (ITO) or Antimony Tin Oxide (ATO), although other transparent and non-transparent materials such as copper can also be used. In some embodiments, the row and column traces can be perpendicular to each other, although in other embodiments other non-Cartesian orientations are possible. For example, in a polar coordinate system, the sensing lines can be concentric circles and the driving lines can be radially extending lines (or vice versa). It should be understood, therefore, that the terms "row" and "column," "first dimension" and "second dimension," or "first axis" and "second axis" as used herein are intended to encompass not only orthogonal grids, but the intersecting traces of other geometric configurations having first and second dimensions (e.g. the concentric and radial lines of a polar-coordinate arrangement). The rows and columns can be formed on a single side of a substantially transparent substrate separated by a substantially transparent dielectric material, on opposite sides of the substrate, or on two separate substrates separated by the dielectric material.

At the "intersections" of the traces, where the traces pass above and below (cross) each other (but do not make direct electrical contact with each other), the traces can essentially form two electrodes (although more than two traces could intersect as well). Each intersection of row and column traces can represent a capacitive sensing node and can be viewed as picture element (pixel) 126, which can be particularly useful when touch sensor panel 124 is viewed as capturing an "image" of touch. (In other words, after panel subsystem 106 has determined whether a touch event has been detected at each touch sensor in the touch sensor panel, the pattern of touch sensors in the multi-touch panel at which a touch event occurred can be viewed as an "image" of touch (e.g. a pattern of fingers touching the panel).) The capacitance between row and column electrodes appears as a stray capacitance when the given row is held at direct current (DC) voltage levels and as a mutual signal capacitance Csig when the given row is stimulated with an alternating current (AC) signal. The presence of a finger or other object near or on the touch sensor panel can be detected by measuring changes to a signal charge Qsig present at the pixels being touched, which is a function of Csig. Each column of touch sensor panel 124 can drive sense channel 108 (also referred to herein as an event detection and demodulation circuit) in panel subsystem 106.

Computing system 100 can also include host processor 128 for receiving outputs from panel processor 102 and performing actions based on the outputs that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/ or the like. Host processor 128 can also perform additional functions that may not be related to panel processing, and can be coupled to program storage 132 and display device 130 such as an LCD display for providing a UI to a user of the device.

In some systems, sensor panel 124 can be driven by high-voltage driver logic. The high voltages that can be required by the high-voltage driver logic (e.g. 18V) can force the high-voltage driver logic to be formed separate from panel subsystem 106, which can operate at much lower digital logic voltage levels (e.g. 1.7 to 3.3V). However, in some embodiments of the invention, on-chip driver logic 114 can replace the off-chip high voltage driver logic. Although panel subsystem 106 can have low, digital logic level supply voltages, analog or digital panel driver circuitry may be implemented on chip. In one embodiment, panel driver circuitry 114 can generate stimulus voltage levels up to twice the maximum voltage allowable for the process of the multi-touch ASIC (e.g. 1.7 to 3.3V) by cascoding two transistors. The high voltage supply can be furnished by charge pump 115 that can also be integrated into the multi-touch ASIC. Although FIG. 1 shows charge pump 115 separate from driver logic 114, the charge pump can be part of the driver logic.

Figure 2A:
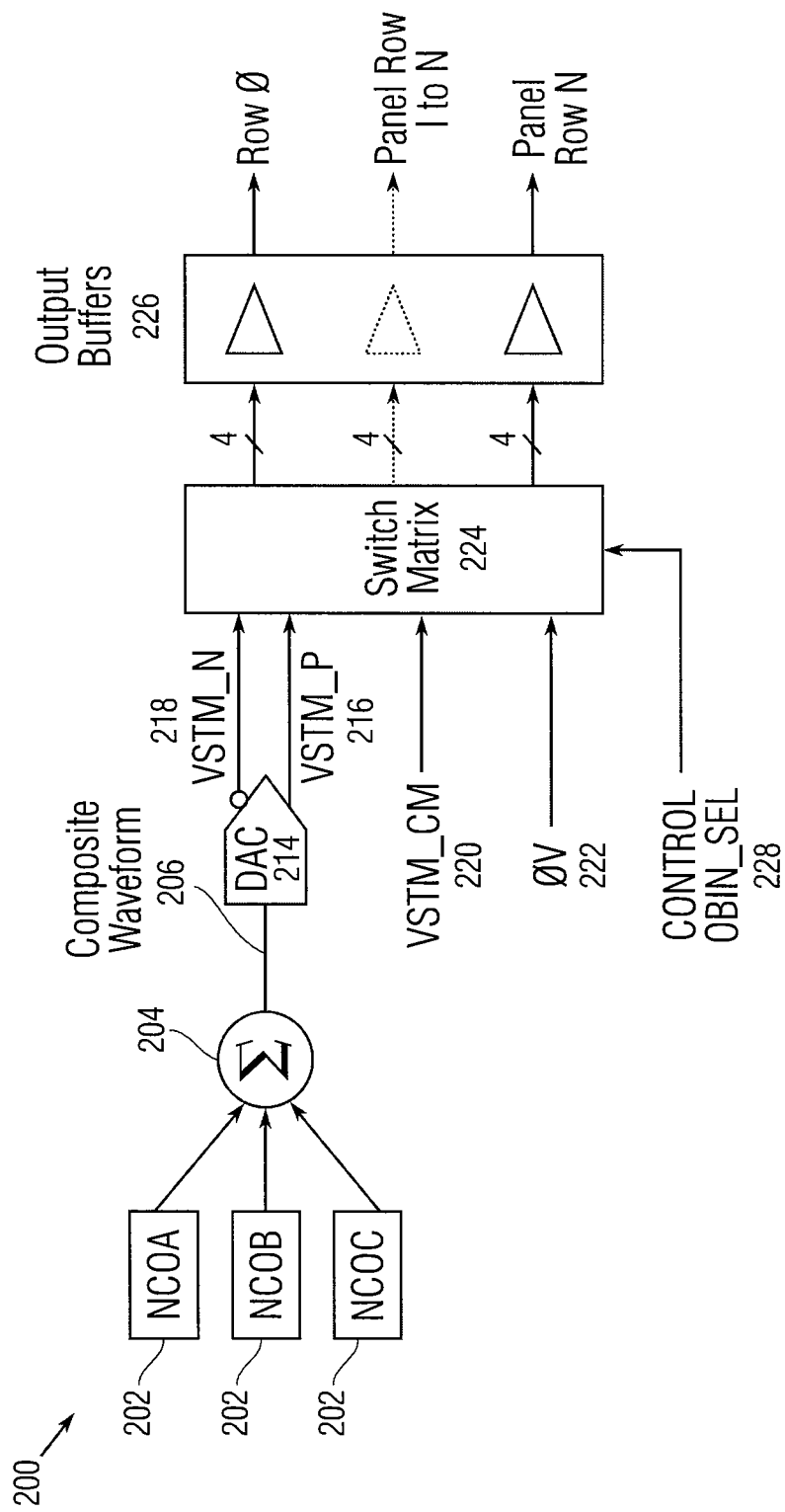
FIG. 2a illustrates an exemplary circuit for generating stimulation frequencies for stimulating the rows on the touch sensor panel according to one embodiment of this invention.

FIG. 2*a* illustrates one exemplary circuit 200 for generating stimulation frequencies for stimulating rows on a touch sensor panel according to embodiments of the invention. In FIG. 2*a*, one or more numerically controlled oscillators (NCOs) 202 (e.g. NCOA, NCOB, NCOC), each generating a signed M-bit digital representation of a different frequency, can be summed in summing circuit 204, producing composite digital waveform 206, which can be converted into an analog waveform by DAC 214. DAC 214 can generate two phases of the analog waveform, a non-inverted (0 degrees or positive phase) version 216 (referred to as VSTM_P), and an inverted (180 degrees or negative phase) version 218 (referred to as VSTM_N) of the analog waveform. VSTM_N, VSTM_P, a common mode voltage VSTM_CM 220 and 0V (see 222) are fed into switch matrix 224. Following the switch matrix is an array of output buffers 226, one per panel row. Control signal OBIN_SEL[ ] 228 allows independent selection of either VSTM_P, VSTM_N, VSTM_CM or 0V for each of the output buffers.

Figure 2B:
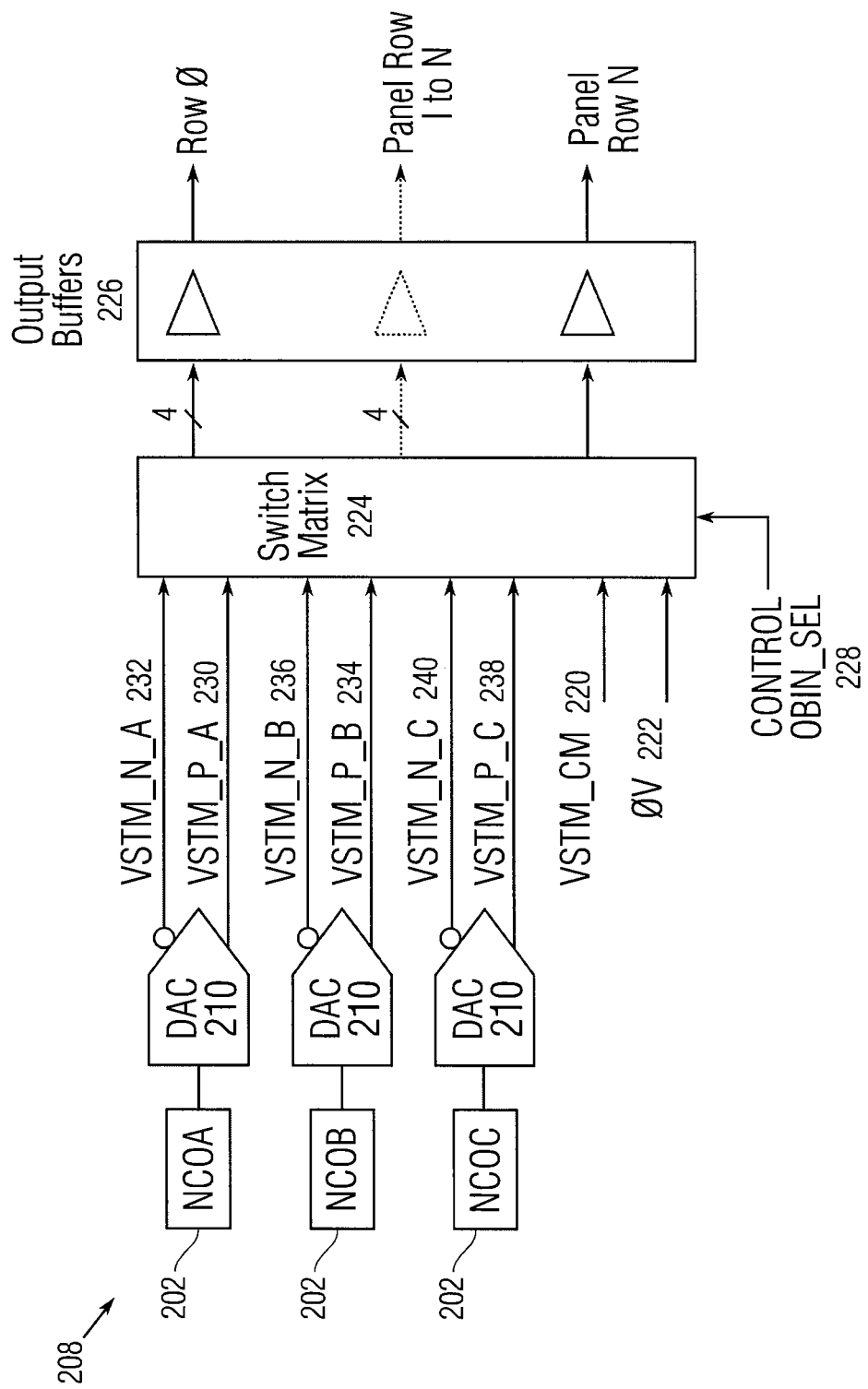
FIG. 2b illustrates another exemplary circuit for generating stimulation frequencies for stimulating the rows on the touch sensor panel according to one embodiment of this invention.

FIG. 2*b* illustrates another exemplary circuit 208 for generating stimulation frequencies for stimulating rows on a touch sensor panel according to embodiments of the invention. In FIG. 2*b*, one or more NCOs 202 are each fed into one or more DACs 210, producing separate analog waveforms 212 VSTM_P_A 230, VSTM_N_A 232, VSTM_P_B 234, VSTM_N_B 236, VSTM_P_C 238, and VSTM_N_C 240, which are fed into switch matrix 224 along with common mode voltage VSTM_CM 220 and 0V 222. Following switch matrix 224 is an array of output buffers 226, one per panel row. Control signal OBIN_SEL[ ] 228 allows independent selection of either VSTM_P_A 230, VSTM_N_A 232, VSTM_P_B 234, VSTM_N_B 236, VSTM_P_C 238, VSTM_N_C 240, VSTM_CM 220 or 0V (see 222) for each of the output buffers. Note that in either FIG. 2*a* or 2*b*, a composite waveform will be seen on the columns of the touch sensor panel.

Figure 3:
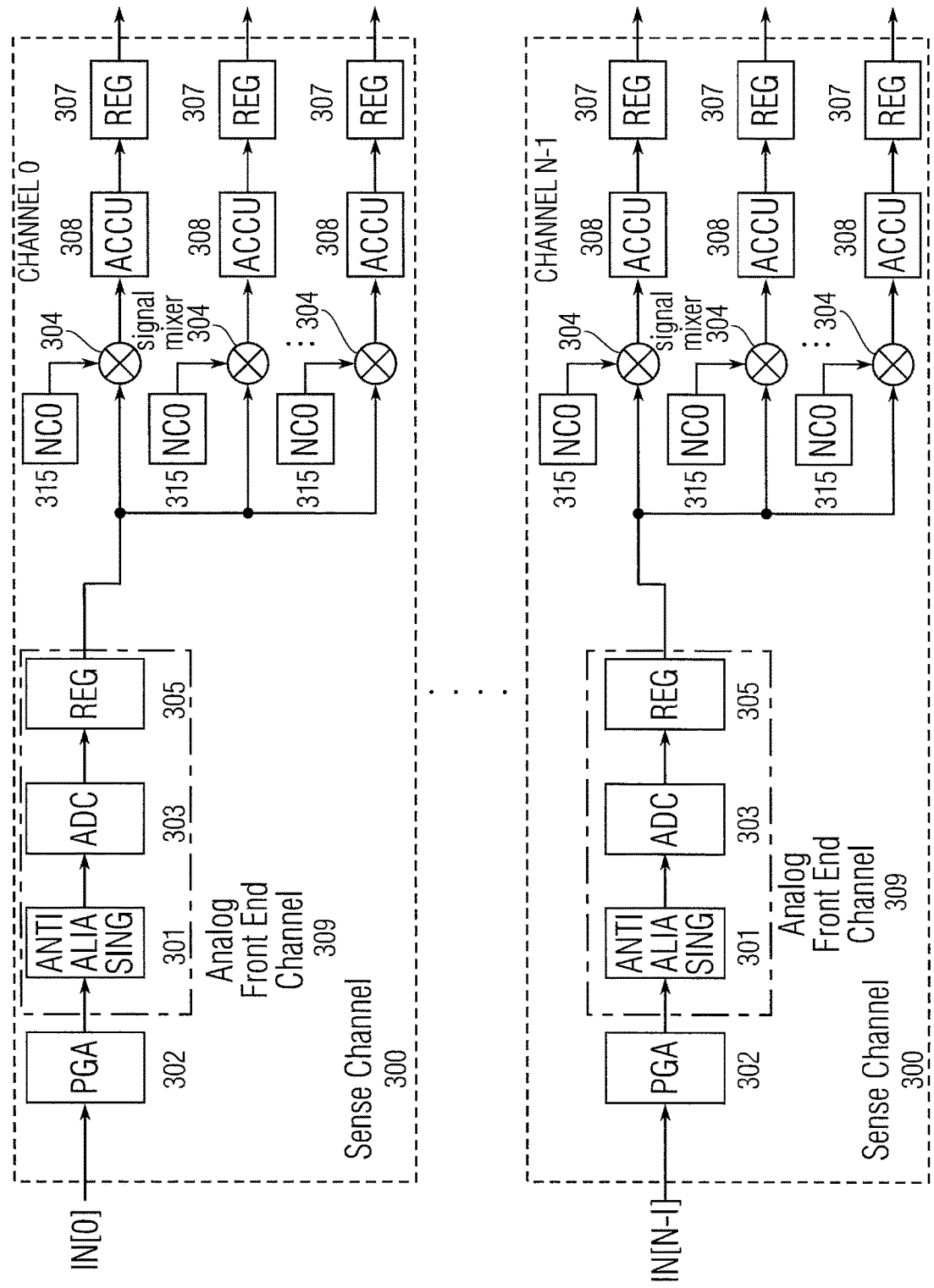
FIG. 3 illustrates a simplified block diagram of N exemplary sense channel or event detection and demodulation circuits according to one embodiment of this invention.

FIG. 3 illustrates a simplified block diagram of N exemplary sense channel or event detection and demodulation circuits 300 according to embodiments of the invention. Each charge amplifier or programmable gain amplifier (PGA) 302 in sense channel 300 can be connected to analog front end channel 309, which in turn can be connected to R signal mixers 304. Beside PGA 302, analog front end channel 309 can include anti-aliasing filter 301, ADC 303, and result register 305. Each signal mixer 304 multiplies the digital signal from analog front end channels 309 with a demodulation signal generated by NCO 315 at the same stimulation frequencies generated by the circuits of FIGS. 2*a* and 2*b*. The demodulated output of each signal mixer 304 can be connected to a separate accumulator 308 and results register 307.

A more detailed description of a touch sensor panel and associated sense circuitry for using multiple stimulation frequencies and phases to detect touch events is described in U.S. application Ser. No. 11/818,345 filed on Jun. 13, 2007 and entitled "Multiple Simultaneous Frequency Detection," the contents of which are incorporated by reference herein.

There is usually no need to perform touch sensor panel scans to obtain images of touch on a continuous basis, especially when there is no indication of any touch on the sensor panel. To save power, crude scanning (auto-scanning) can be performed periodically to determine the existence of a touch on the sensor panel, without involvement of the processor. Because the device is generally placed in a low power state within minimal functions operative, auto-scanning can be used for power management.

Referring again to FIG. 1, computing system 100 can include auto-scan logic. Auto-scan logic can reside either in channel scan logic block 110 of panel subsystem 106, separate from channel scan logic 110 in panel subsystem 106, or entirely separate from panel subsystem 106. In general, auto-scan logic can autonomously read data from sense channels 108 and provide control of sense channels 108. This can be referred to as "auto-scan mode." Accordingly, auto-scan mode enables computing system 100 to scan touch sensor panel 124 without intervention from panel processor 102, and while one or more system clocks are disabled. This allows computing system 100 to conserve power or free up components (such as panel processor 102) to perform other tasks while the system is in auto-scan mode.

For example, because a user may not be regularly using touch sensor panel 124 as an input device, it can be desirable to initiate auto-scan mode after a predetermined amount of time has transpired without any touch events. By doing so, computing system 100 can conserve power while no touch events are received, but power back up once touch events are received.

Figure 4:
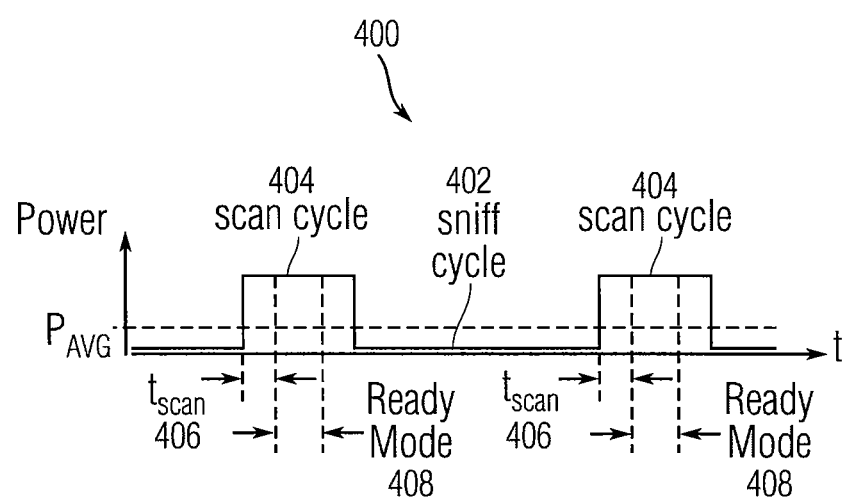
FIG. 4 illustrates an exemplary plot of power management versus time according to one embodiment of this invention.

FIG. 4 illustrates an exemplary plot of power management versus time 400 according to embodiments of the invention. Note that in FIG. 4, there is a "sniff" cycle 402 during which only a low frequency clock, a sniff timer and a calibration timer may be active. After the sniff timer times out, auto-scan cycle 404 is performed during which the touch sensor panel is scanned at 406. During scan cycle 404, the low frequency clock, a high frequency clock, auto-scan control logic and other components needed to perform an auto-scan are powered up, but the panel processor remains inactive and in a low power state. The total auto-scan cycle, which can include the sniff cycle and the scan cycle, can be repeated every 50 ms, for example. To keep the average power Pavg low, it is desirable to keep the scan time tscan 406 during each scan cycle 404 as small as possible and the scan cycle as long as practical.

Figure 5:
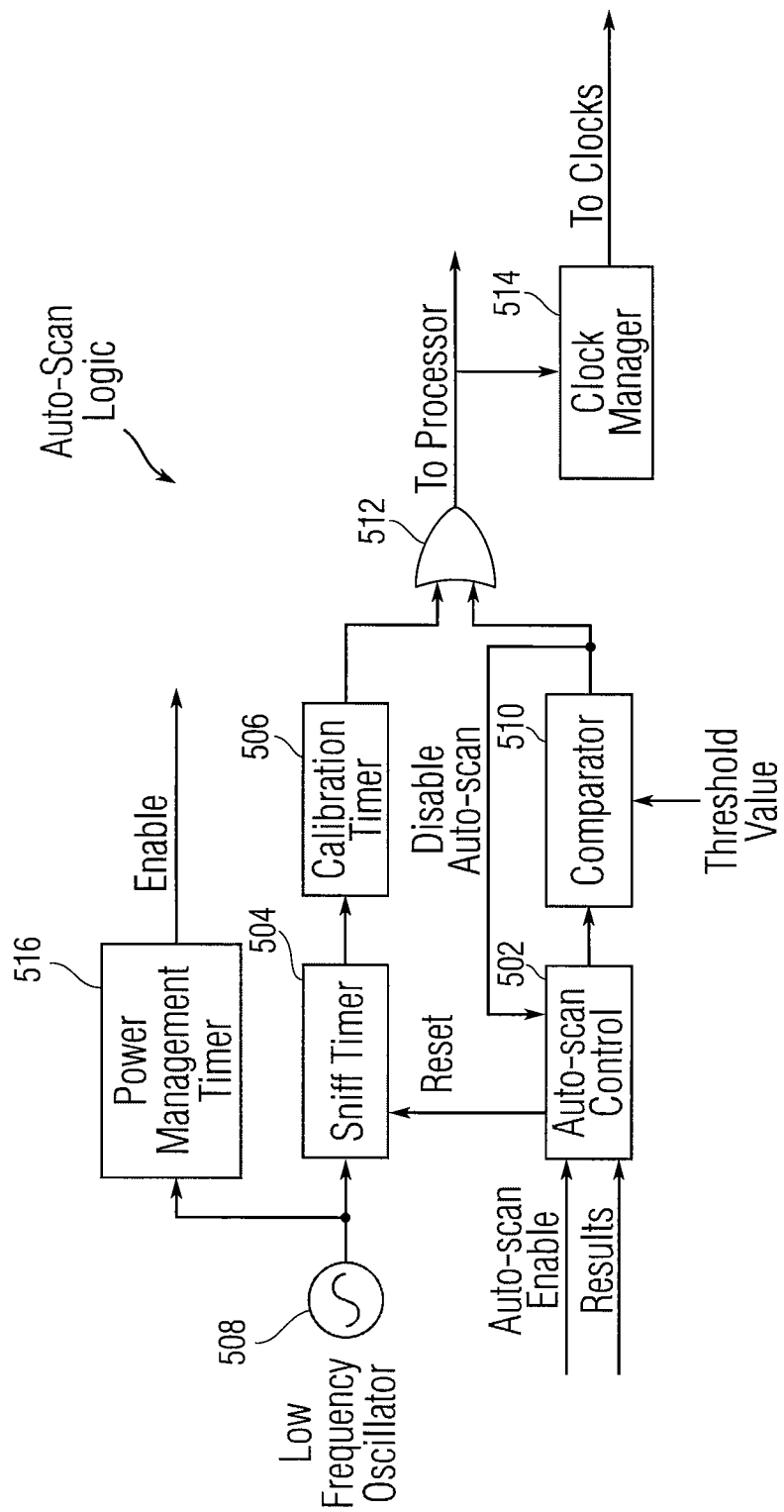
FIG. 5 illustrates exemplary auto-scan logic according to one embodiment of this invention.

FIG. 5 illustrates exemplary auto-scan logic 500 according to embodiments of the invention. As shown in FIG. 5, auto-scan logic 500 can include auto-scan control 502, which can control row address and channel timing functions, among other things. In one embodiment, auto-scan control 502 can include a row address state machine and a channel timing state machine for controlling scanning the scanning of a touch sensor panel. Sniff timer 504 and calibration timer 506 can be clocked by oscillator 508. Oscillator can be a low frequency oscillator or high frequency oscillator. However, for power conservation, a low frequency oscillator can be desirable. After a predetermined amount of time, sniff timer 504 initiates an auto-scan sequence. Note that auto-scan mode can include an actual sniff interval during which only a low frequency oscillator and a sniff timer is active, and a scan sequence in which a touch sensor panel is actively scanned. These two system states can together form the auto-scan mode.

In general, an auto-scan process can be enabled by first enabling auto-scan control 502 and then putting the panel processor into a wait for interrupt state. Clock manager 514 then disables the processor clock and initiates sniff timer 504, which after a sniff timeout, causes clock manager 514 to sends a request to the channel scan logic to perform a scan while keeping the panel processor inactive. The channel scan logic then acquires an image of touch for the touch sensor panel. Touch image results from the sense channels can be subtracted by a baseline image stored and compared to a threshold value. If the resulting value is above the programmable threshold value, indicating a touch event has been detected, an interrupt is set and the panel processor is awakened. If the resulting value is below the threshold value, then the system remains in auto-scan mode until either the calibration timer expires or an external interrupt occurs. Accordingly, auto-scan mode permits multi-touch data input to be read from the touch sensor panel while the panel processor is inactive. In one embodiment, sniff timer 504 is reset each time the sniff timer initiates an auto-scan sequence. The sniff time can be in the range of eight milliseconds to two seconds, for example.

Calibration timer 506 can wake up the panel processor when auto-scan logic 500 stays in auto-scan mode for an extended amount of time without any touch events detected on the touch sensor panel that exceed a certain threshold. In one embodiment, calibration timer 506 initiates a "calibration" upon expiration of a predetermined amount of time ("calibration time"). A "calibration" can include waking up the high frequency oscillator and activating the system clock and panel processor to perform a scan of the touch sensor panel. The calibration can also include calibration functions, such as accounting for any drift in the touch sensor panel. In one embodiment, the calibration time is greater than the sniff time and can be in the range of two seconds to 300 seconds.

Comparator 510 compares offset compensated results with a threshold value as described above. In one embodiment, if the threshold value is exceeded, indicating that one or more touch events have been detected on the touch sensor panel, the computing system can be taken out of auto-scan mode and placed into active scan mode. The comparison of the threshold value with the compensated results can be performed on a channel-by-channel, row-by-row basis. In one embodiment, the threshold value can be programmed into a threshold value register.

OR gate 512 can be included between the output paths of calibration timer 506 and comparator 510. Accordingly, when either the calibration time of calibration timer 506 or the threshold value of comparator 510 is exceeded, OR gate can initiate sending an interrupt signal to the panel processor and clock manager 514 for the purpose of re-enabling the panel processor and clocks.

Clock manager 514 can control one or more clocks in the computing system. In general, when any clocks are not needed at a given time, clock manager 514 can disable those clocks to conserve power, and when any disabled clocks are needed, clock manager 514 can enable those clocks. In one embodiment, clock manager 514 can control low frequency oscillator 508, the high frequency oscillator (not shown) and the system clock (not shown) clocking the panel processor.

Power management timer 516 can be included in the auto-scan logic. Power management timer 516 counts up to a time equal to the sniff time less a delay time. The delay time can be the amount of time needed for the computing system to get ready to perform a scan and "settle" the high voltage drivers (i.e. provide a stable supply voltage) prior to performing a scan. The delay time can be adjusted via a power manager register, and can be different for each channel that is scanned.

A more detailed description of exemplary auto-scan logic is described in U.S. application Ser. No. 11/650,040 filed on Jan. 3, 2007 and entitled "Multi-Touch Auto-Scanning," the contents of which are incorporated by reference herein.

The previous paragraphs describe an exemplary computing system including a touch sensor panel, drive logic, sense logic, and channel-scan logic. The following paragraphs describe various multi-frequency and phase stimulation auto-scan techniques according to embodiments of the invention that can be implemented using the logic described above.

Figure 6A:
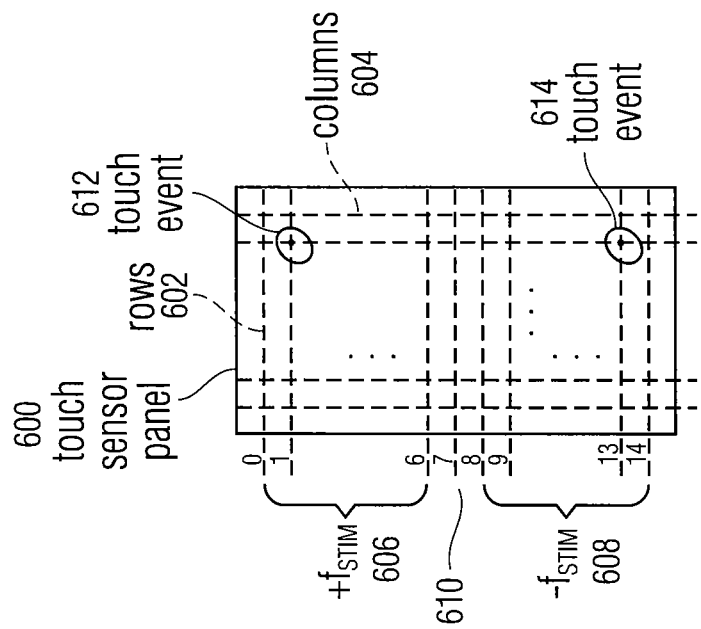
FIG. 6a illustrates an exemplary multi-frequency and phase stimulation auto-scan technique according to one embodiment of this invention.

FIG. 6a illustrates an exemplary multi-frequency and phase stimulation auto-scan technique according to embodiments of the invention. In the exemplary embodiment of FIG. 6a, touch sensor panel 600 includes 15 drive rows 602 and 10 sense columns 604, although it should be understood that any number of rows and columns may be present. In the example of FIG. 6a, simultaneously during every frame, seven rows 606 can be driven with a positive phase of a particular stimulation signal (VSTM_P or +fstim), seven rows 608 can be driven with the anti-phase (180 degrees out of phase) of the stimulation signal (VSTM_N or −fstim), and one row 610 can be left unstimulated. The stimulation signal fstim can be a single frequency (see FIG. 2b), or it can be a composite of multiple frequencies (see FIG. 2a). Although FIG. 6a only shows touch sensor panel 600 stimulated with the in-phase and anti-phase components of a single stimulation signal for purposes of illustration only, in other embodiments, multiple stimulation signals of different frequencies (single or composite) and amplitudes can be used, as long as the same number of rows are also stimulated with the in-phase and anti-phase components of those signals.

Because in one embodiment the same number of rows are stimulated with the in-phase (VSTM_P) and anti-phase (VSTM_N) components of the one or more stimulation signals, the resulting charges Qsig_P=Csig*VSTM_P and Qsig_N=Csig*VSTM_N injected into a given column electrode cancel each other out, and there will be virtually no charge seen at the input to each sense channel coupled to the sense columns. In other words, the effective input charge Qsig=Qsig_N+Qsig_P coupled into the sense channel will be approximately zero. However, if a finger touches down at 612 over one of the rows stimulated with +fstim, an imbalance will be created, and Qsig_sense P=Csig_sense*VSTM_P will appear on the input to one or more sense channels, indicating a touch event. It should be understood that the location of the touch event at 612 will not be identified, but is not necessary, because the primary purpose of this auto-scan technique is to determine that a touch event occurred, not where it occurred. The detection of the touch event can then trigger the system to enter a "ready mode," described hereinafter, or wake up, activate the panel processor, and perform a full panel scan. In either case, data can be gathered so that the location of the touch event can be subsequently identified.

Figure 6B:
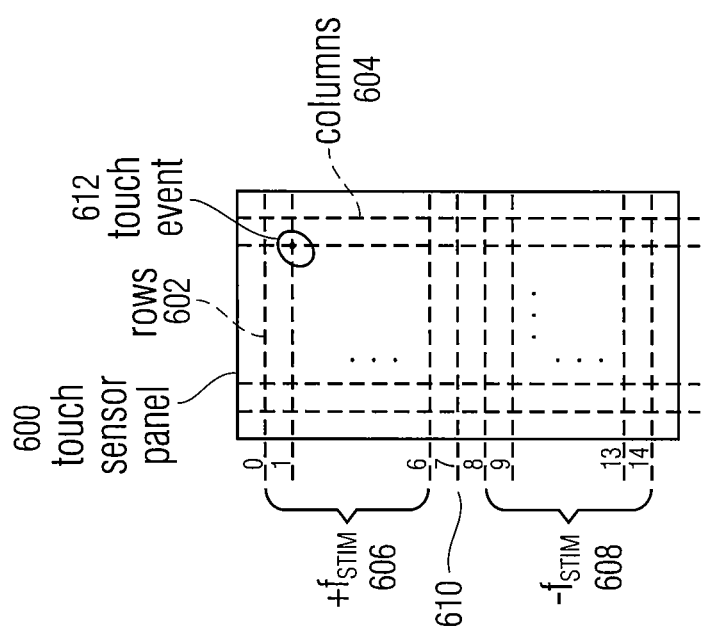
FIG. 6b illustrates an exemplary multi-frequency and phase stimulation auto-scan technique when two touch events are present.

FIG. 6b illustrates an exemplary multi-frequency and phase stimulation auto-scan technique when two touch events are present. As in the example of FIG. 6a, a touch event is present at 612 over one of the rows stimulated with +fstim. However, if a second touch event 614 occurs over a row stimulated by −fstim, and both touch events 612 and 614 occur over the same column, these two touch events can cancel each other out, and neither of the touch events may be detected.

Figure 6C:
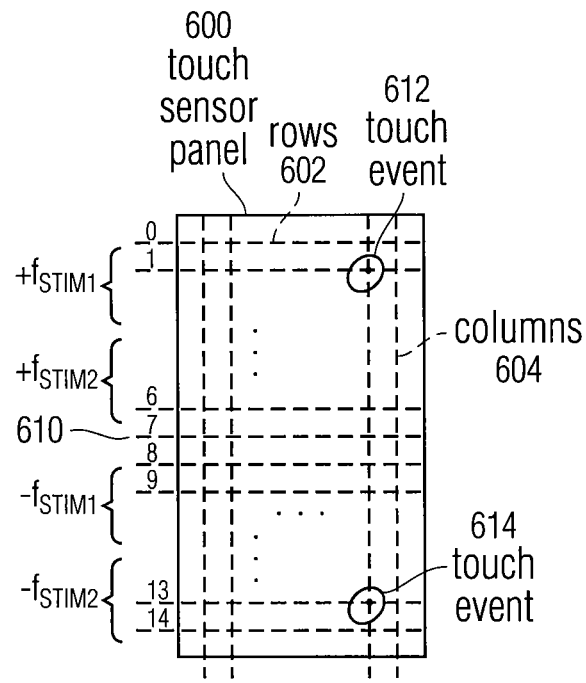
FIG. 6c illustrates an exemplary multi-frequency and phase stimulation auto-scan technique to detect a touch event when two touch events are present according to one embodiment of this invention.

FIG. 6c illustrates an exemplary multi-frequency and phase stimulation auto-scan technique to detect a touch event when two touch events are present according to embodiments of the invention. In FIG. 6c, two different frequency stimulation signals (fstim1 and fstim2) and their in-phase and anti-phase components (+fstim1, +fstim2, −fstim1, −fstim2) simultaneously drive rows in such a manner as to have the same number of rows stimulated with the in-phase and anti-phase components of those signals (i.e. balanced regions). By doing this, two touch events 612 and 614 may cover rows stimulated by different frequencies (+fstim1 and −fstim2 in the example of FIG. 6c), and in that case there would be no canceling out of touch events, and the touches would be detected. It should be understood that the concept illustrated in FIG. 6c can be extended to more than two frequencies and balanced regions, and the increased number of different stimulation signal frequencies and phases will increase the likelihood of detecting touch events.

Figure 6D:
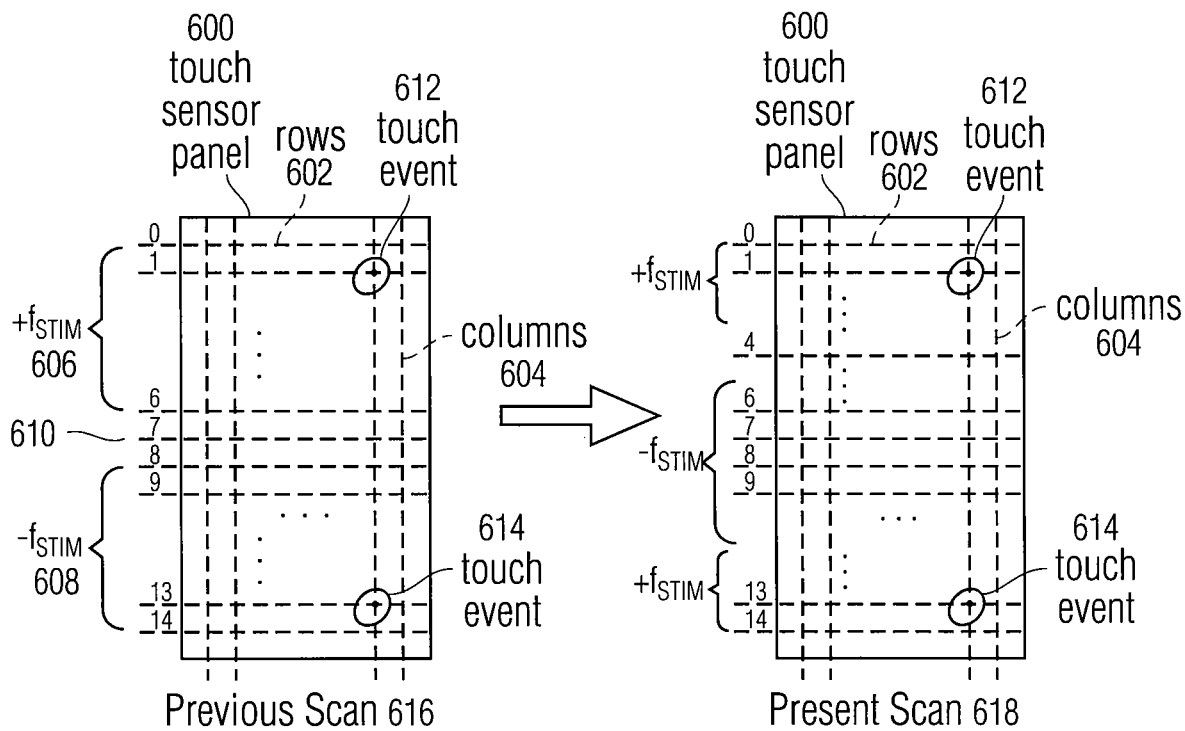
FIG. 6d illustrates another exemplary multi-frequency and phase stimulation auto-scan technique to detect a touch event when two touch events are present according to one embodiment of this invention.

FIG. 6d illustrates another exemplary multi-frequency and phase stimulation auto-scan technique to detect a touch event when two touch events are present according to embodiments of the invention. If FIG. 6d, the simultaneous stimulation pattern is varied in subsequent scans. In previous scan 616, rows 0-6 are stimulated with +fstim, row 7 is left unstimulated, and rows 8-14 are stimulated with −fstim. In previous scan 616, as in the example of FIG. 6b, touch events 612 and 614 may not be detected. However, in present scan 618, the stimulation pattern is varied so that rows 0-3 and 12-14 are stimulated with +fstim, rows 5-11 are stimulated with −fstim, and row 4 is left unstimulated. In present scan 618, because both touch events 612 and 614 are located in regions being stimulated with +fstim, the touch events will not cancel each other out and will be detected. It should be understood that the concept illustrated in FIG. 6d can be extended to more than two frequencies and any number of balanced regions over any number of stimulation patterns, and the increased number of different stimulation signal frequencies, phases, balanced regions and patterns will increase the likelihood of detecting touch events.

In another embodiment of the invention, the number of rows stimulated with the in-phase and anti-phase signals can be imbalanced, but the amplitude of the signals can be varied to once again achieve a canceling out effect.

One advantage of the methodologies illustrated in FIGS. 6a-6d is that because no charge is normally detected and a touch causes a small amount of charge coupling a smaller feedback capacitor Cfb is needed in the charge amplifier to detect a touch, resulting in a reduction in die area for the ASIC incorporating the charge amplifier. Another advantage is that this type of sensing is very sensitive and yields the highest dynamic range utilization in the charge amplifier as the static DC component (CSIG) essentially falls out. However, because multiple frames are needed for the methodology of FIG. 6d, more power is consumed.

Figure 6E:
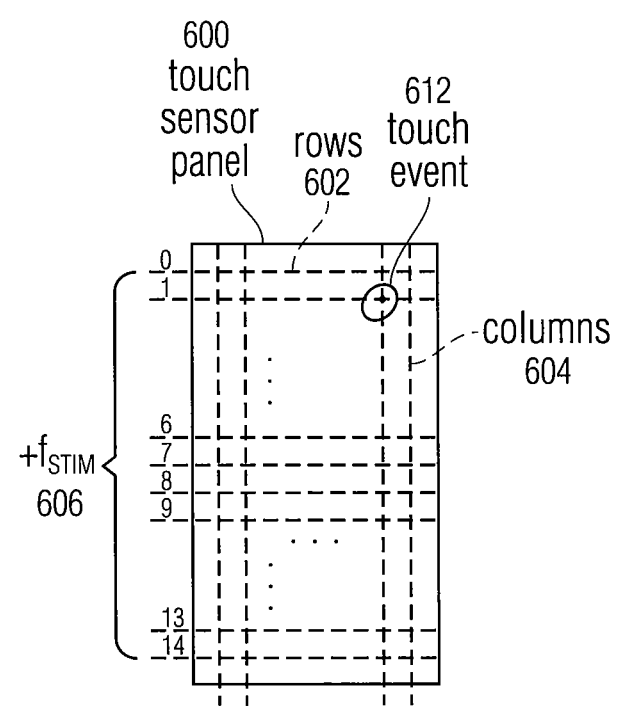
FIG. 6e illustrates an exemplary single-frequency and phase stimulation auto-scan technique according to one embodiment of this invention.

FIG. 6e illustrates an exemplary single-frequency and phase stimulation auto-scan technique according to embodiments of the invention. In the example of FIG. 6e, representing a new auto-scan mode, the same frequency and phase (essentially the same stimulation signal) such as the positive phase of a particular frequency (e.g. +fstim 606) can be applied to all rows in a single frame. Because the configuration of FIG. 6e is unbalanced, the charges Qsig=Csig*N_ROWS*VSTM_P and Qsig_sns=Csig_sense*N_ROWS_TOUCHED*VSTM_P into the charge amplifiers will be non-zero (but different) during no-touch and touch conditions, respectively. A touch can still be detected, however, because there is a detectable difference in charge coupling between the touch and no-touch conditions. One advantage of the methodology of FIG. 6e is that fewer frames are needed, which saves power. However, Cfb must be larger to detect a larger amount of charge coupling primarily because of the static component, QSIG. Furthermore, because the difference between the touch and no-touch condition is small, there is a loss of dynamic range (i.e. it is harder to detect a touch).

The exemplary methodologies of FIGS. 6a-6e are able to detect that a touch occurred, but do not identify where the touch occurred. In embodiments of the invention, any of these methodologies can be followed by a "ready mode," which is a multi-stim sequence that is performed over multiple timing sequences per individual scan to capture multi-touch images. An advantage of this scheme is that it can be used to determine the exact touch location. In other words, any of the methodologies of FIGS. 6a-6e can be used to determine if there is a touch, and if a touch is detected, the ready mode can be entered and a multi-stim sequence can performed to gather and save the data needed to determine the location of the touch. Only after the data is saved is the panel processor awakened.

The ready mode can be used to capture multi-touch image without intervention from the panel processor so the image data can be available for processing after a touch condition has occurred. This power management mode can aid in the conservation of power as it does not require intervention from the panel processor. In the ready mode scan, composite multi-touch data can be captured over multiple timing sequences (for example 16 sequences, 200 us each) and posted into a buffer. Since this multi-touch data is composite data, a separate matrix decode logic is needed to extract the actual per-pixel Csig values and posts them to memory such as SRAM where the processor can access the data for further processing after a touch condition has been detected. Each ready mode scan can be comprised of several individual image scans, each performed at one or multiple different stimulus frequencies. Ready mode can precede or follow a scan in an auto-scan mode or can be performed in a separate scan.

Referring again to FIG. 4, as mentioned above, after the sniff timer times out, auto-scan cycle 404 is performed during which the touch sensor panel is scanned at 406. Scan 406 can be performed using any of the methodologies of FIGS. 6a-6e. Following scan 406, if a touch was in fact detected, ready mode 408 as described above can be performed, during which time multi-stim sequences can be performed to gather sufficient data to determine the actual location of touch. Ready mode 408 can be performed over multiple frames to gather data. After the data has been gathered and ready mode 408 has been completed, the panel processor can be powered up to process the data. Sniff cycle 402 can then be resumed.

Although any number of stimulation patterns can be performed in multiple auto-scans in an attempt to detect multiple fingers, each scan raises the average power Pavg of the system, causing increased battery drain. To reduce battery drain, the duration of each scan can be made shorter to reduce the increase in Pavg due to binary detection thresholds.

To reduce the duration of each scan, it should first be established that a full-scale target value (FS_targ) can be defined as the maximum change in the output of each accumulator in each sense channel (see FIG. 3) due to a full-scale change in Qsig_sense. In other words, FS_targ represents the total change in the output of each accumulator as it varies from a "no-touch" to a "full-touch" condition. (i.e. the total change in the amount of charge injected into each sense channel between a "full-touch" and "no-touch" condition). To detect a touch event, the threshold for the output of the accumulators can be set to about half way between the range of values defined by FS_targ as determined during factory calibration. For example, if the output of an accumulator varied from N=55000 (no-touch) to N=50000 (touch), resulting in an FS_targ of 5000, the threshold can be set to N=2500. By setting the threshold in this manner, 50% of the lower range can be allocated for noise immunity and 50% of the upper range can be allocated for reliable threshold detection, as the output the accumulator may drift toward the set threshold due to temperature, panel or other drift components. The smaller the upper threshold margin, the less likely it is that a touch condition is detected reliably. The smaller the lower threshold margin, the more likely it is that noise causes false wake-ups, which ultimately cause increased power consumption.

The longer the accumulator integrates, the lower the noise component of the integrated signal at the output of the accumulator, so in general, a longer scan time (and thus a longer integration time) reduces noise. However, with more noise immunity available due to the setting of the accumulator threshold as described above, the scan time (and therefore the integration time) can be reduced. Although the reduced scan time increases noise levels, the scan time can be selected to maintain noise levels to within tolerable levels. By reducing the scan time and setting the accumulator threshold for detecting a touch event as described above, multiple scans can be used to increase accuracy of touch detection while maintaining Pavg at acceptable levels.

Figure 7:
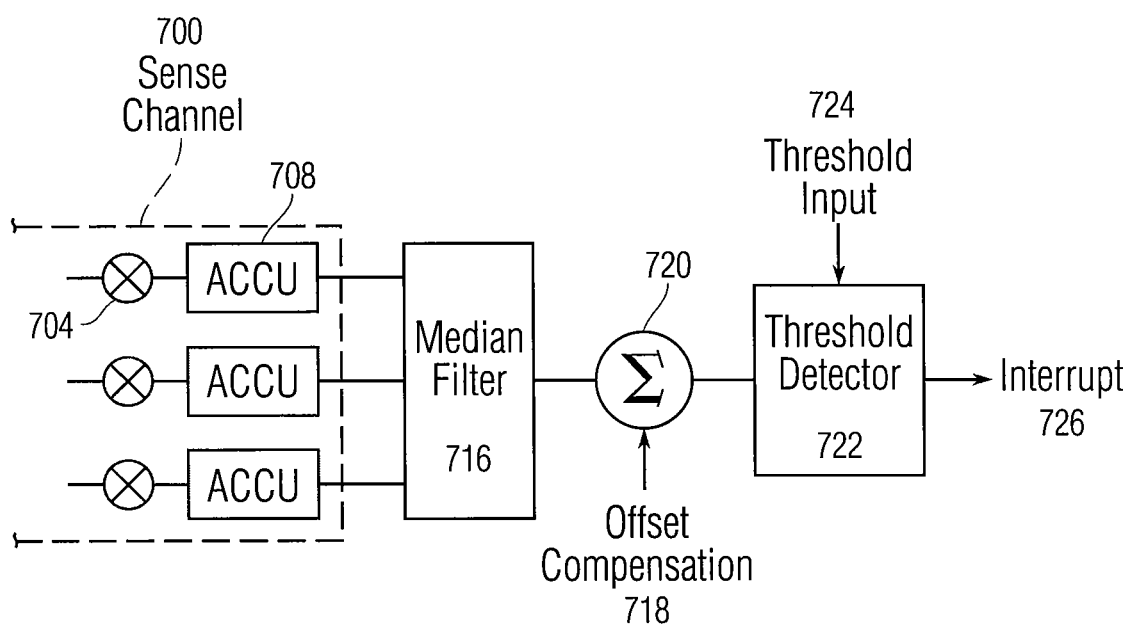
FIG. 7 illustrates the back end of a sense channel, with a median filter connected to the accumulator outputs for detecting a touch event according to one embodiment of this invention.

FIG. 7 illustrates the back end of sense channel 700, with median filter 716 connected to the outputs of accumulators 708 for detecting a touch event according to embodiments of the invention. Median filter 708 can essentially reduce the effect of an input value that is the most different from the average of all input values, on the assumption that the most different input value can be corrupted due to the effects of noise in the system. The output of median filter 708 can then be summed with offset compensation 718 in summing circuit 720. Threshold detector 722 with threshold input 724 set to a particular value (e.g. FS_targ/2) can then determine if the threshold is exceeded, and can set interrupt 726 if it is exceeded. Interrupt 726 is ORed together with all other channels to generate a global interrupt.

Figure 8:
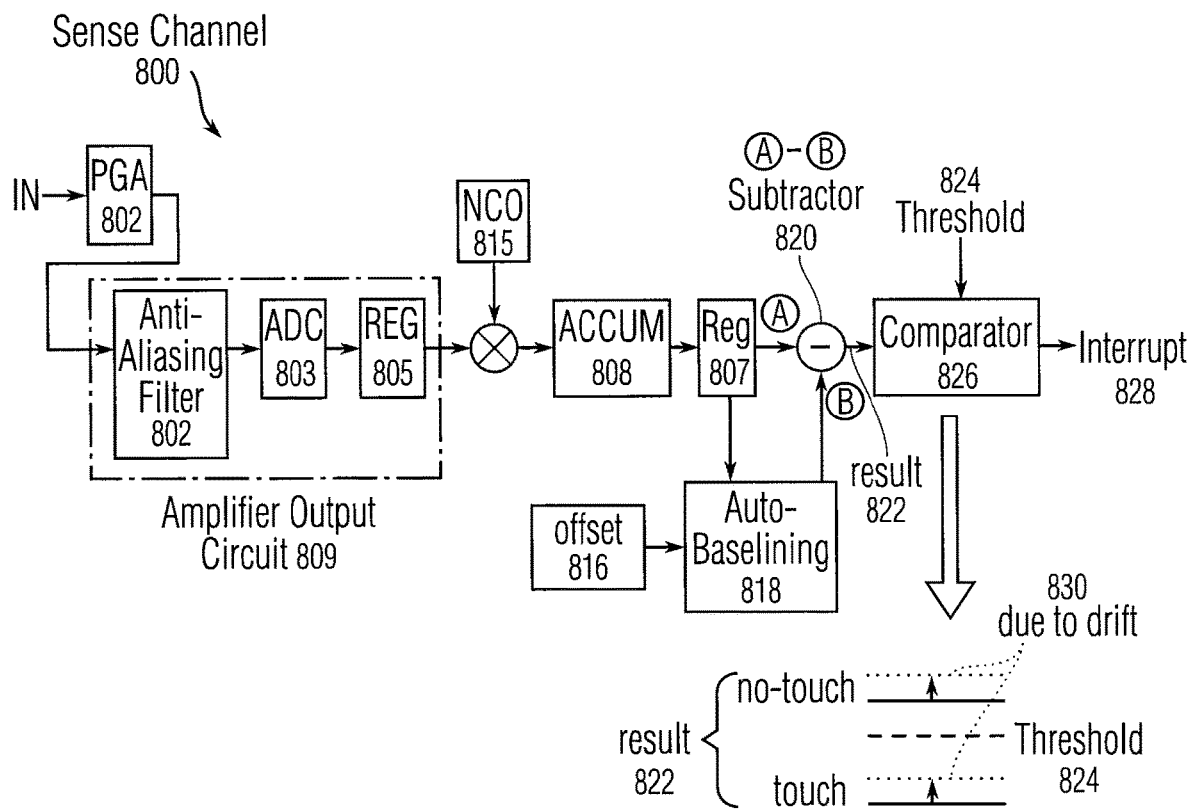
FIG. 8 illustrates an exemplary sense channel with auto-baselining according to one embodiment of this invention.

FIG. 8 illustrates an exemplary sense channel 800 with auto-baselining according to embodiments of the invention. In FIG. 8, offset value 816 is compared to the output of results register 807 in auto-baselining logic 818, and any difference (B) (which can be the result of drift due to temperature, humidity and other environmental conditions) can be subtracted from the output (A) of the results register using subtractor 820. The offset compensated result value 822 is then compared to threshold value 824 in comparator 826.

In one embodiment, under ideal, no-drift, no-touch conditions, offset 816 and auto-baselining logic 818 can produce an output (B) that yields a result value 822 of FS_targ. In other words, offset 816 can be set to approximately the touch value of results register 807. This can yield a value of about zero out of the subtractor 820 during a touch condition and a value of FS_targ during a no_touch condition. The comparator 826 can be set up to provide an interrupt 828 during a touch condition when the result drops below the threshold value that can be set to FS_targ/2, for example. Offset value 816 can be periodically updated by comparing the output of result register 807 to the offset value and the previous history of output (B) to compensate for drift in sense channel 800 and ensure that the result value is always being maintained at the proper value (A).

However, in another embodiment, under ideal, no-drift, no-touch conditions, offset 816 and auto-baselining logic 818 can produce an output (B) that yields a result value 822 of about zero. In other words, offset 816 can be set to approximately the no-touch value of results register 807. This can yield a value of about zero out of the subtractor 820 during a no-touch condition and a value of −FS_targ during a touch condition. The comparator 826 can be set up to up provide an interrupt 828 during a touch condition when the result drops below the threshold value that can be set to −FS_targ/2, for example. Offset value 816 can be periodically updated by comparing the output of result register 807 to the offset value and the previous history of value (B) to compensate for drift in sense channel 800 and ensure that the result value is always being maintained at the proper value of about zero. In this embodiment, offset compensated result value 822 can have a value of zero in a no-touch condition, and can be less than zero in a touch condition.

In either of these embodiments, if a touch event occurs, result value 822 changes, and if threshold 824 is exceeded, interrupt 828 is sent to the panel processor indicating that a touch event has been detected and that the panel processor should be powered up.

FIG. 8 also shows how the touch and no touch result values for result 822 can drift (see 830) due to temperature and other environmental conditions. As discussed above, threshold 824 can be set to the middle of the possible output range to improve noise immunity. However, if there is drift 830 in the no-touch and touch result values, threshold 824 may no longer be in the middle of the range, and noise can cause false interrupts and the unnecessary awakening of the panel processor, which can increase power consumption. Auto-baselining logic 818 and offset 816 maintain threshold 824 in the middle of the range by compensating for drift 830, allowing noise immunity to be maintained even in the presence of drift.

When entering auto-scan mode, offset value 816 can be loaded into an offset register which produces output (B). Whenever auto-baselining is initiated (after completing a scan in auto-scan mode, for example), the offset register value can be compared to the result register value. If the result register value is greater than the value stored in the offset register, the offset register can be incremented by a programmable value (e.g. 1). If the result register value matches the offset register value, the offset register value remains unchanged. If the result register value is below the offset register value, the offset register value is decremented by a programmable value. Using this technique, the auto-baselining logic can track small changes in the baseline, yet reject large changes in the baseline value out of result register 807 due to a touch condition or noise.

Figure 9:
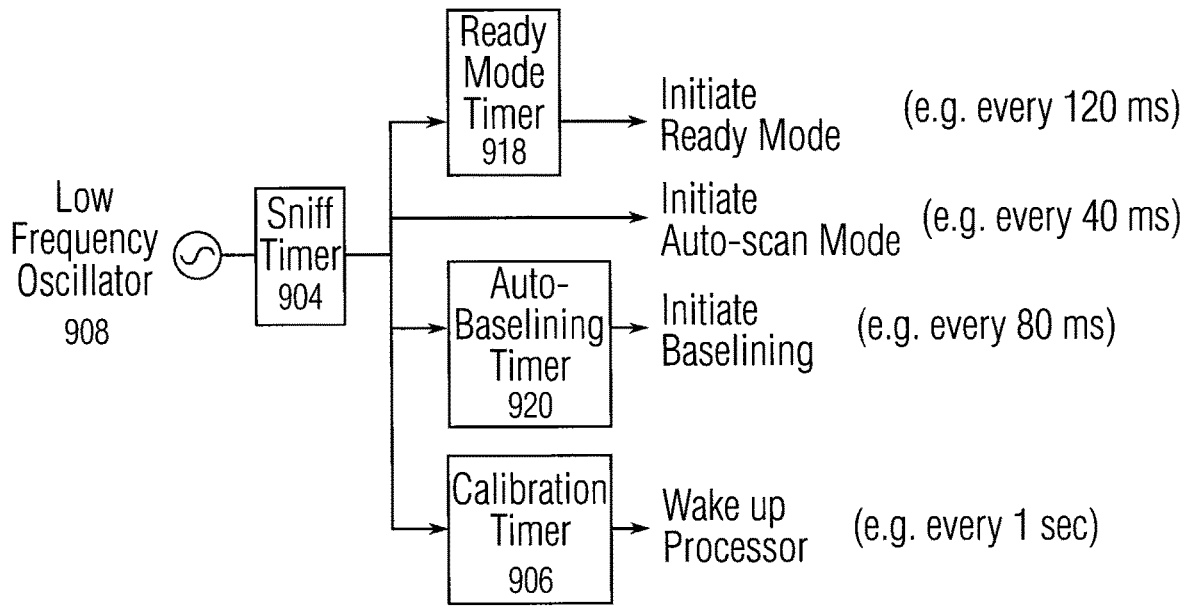
FIG. 9 illustrates how the sniff timer can initiate a ready mode, an auto-scan mode, auto-baselining, and the awakening of the processor according to one embodiment of this invention.

FIG. 9 illustrates how the sniff timer can initiate some of the operations discussed above according to embodiments of the invention. In FIG. 9, low frequency oscillator 908 clocks sniff timer 904, which can then initiate auto-scan mode (e.g. after 40 ms), trigger ready mode timer 918 to start the ready mode (e.g. after 120 ms), trigger auto-baseline timer 920 to trigger periodic baselining (e.g. after 80 ms) to update the offset value, and trigger calibration timer 906 to wake up the panel processor (e.g. after one second). In another embodiment, auto-baseline timer 920 can be adaptive. For example, auto-baseline timer 920 can be shortened if it is determined that large updates to the offset value are needed, indicating a large amount of drift between updates.

Figure 10A:
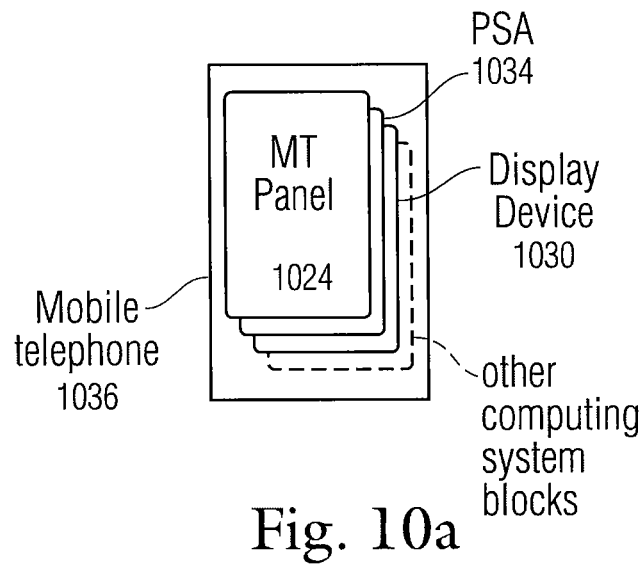
FIG. 10a illustrates an exemplary mobile telephone that can perform an auto-scan operation according to one embodiment of this invention.

FIG. 10*a* illustrates an exemplary mobile telephone 1036 that can include touch sensor panel 1024, display device 1030 bonded to the sensor panel using pressure sensitive adhesive (PSA) 1034, and other computing system blocks in computing system 100 of FIG. 1 for performing an auto-scan operation according to embodiments of the invention.

Figure 10B:
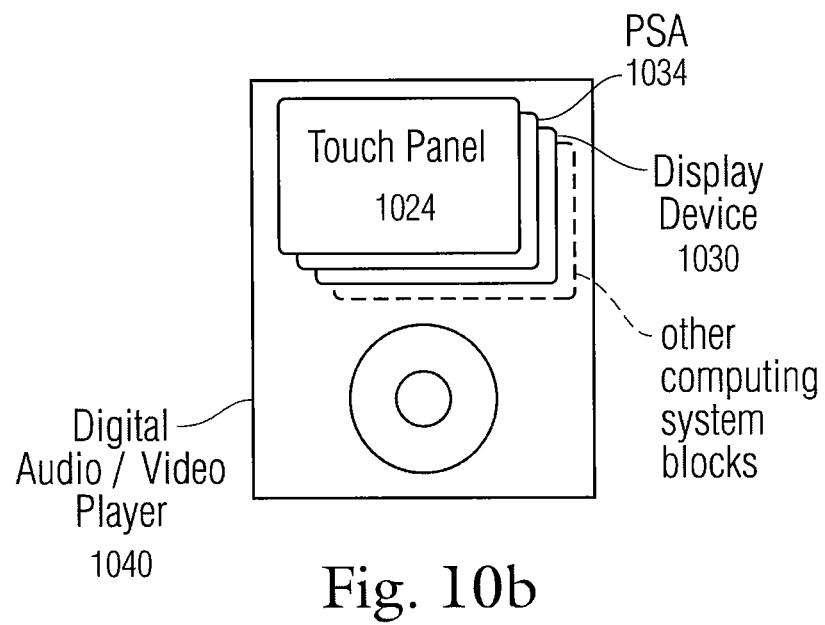
FIG. 10b illustrates an exemplary digital audio player that can perform an auto-scan operation according to one embodiment of this invention.

FIG. 10*b* illustrates an exemplary digital audio/video player 1040 that can include touch sensor panel 1024, display device 1030 bonded to the sensor panel using pressure sensitive adhesive (PSA) 1034, and other computing system blocks in computing system 100 of FIG. 1 for performing an auto-scan operation according to embodiments of the invention.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. A method for detecting whether a touch event has occurred on a touch sensor panel, comprising:
   while maintaining a panel processor in a reduced power state,
   generating one or more stimulation signals, the stimulation signals representing AC waveforms having one or more frequencies and one or more phases;
   simultaneously driving a first group of rows of the touch sensor panel with the one or more stimulation signals in a single scan of sense nodes on the touch sensor panel, each of the first group of rows receiving a plurality of periods of a particular stimulation signal during each scan, and coupling charge from the first group of rows into one or more columns of the touch sensor panel,
   determining whether first output signals received from one or more sense channels coupled to the one or more columns of the touch sensor panel exceeds a predetermined threshold indicative of a change in the charge coupled into one of the columns and the occurrence of a touch event, and
   when at least one of the first output signals exceeds the threshold indicative of sufficient charge coupling onto a column of the touch sensor panel to recognize the touch event, triggering a subsequent capture of second output signals from the one or more sense channels, different from the first output signals, the second output signals for determining a location of the touch event.

2. The method of claim 1, further comprising:
   driving the first group of rows driven with in-phase components of the one or more stimulation signals; and
   simultaneously driving a second group of rows with anti-phase components of the one or more stimulation signals in a balanced manner so that in a no-touch condition, a net charge injected into each of one or more columns of the touch sensor panel is about zero.

3. The method of claim 2, the one or more first stimulation signals comprising two or more stimulation signals at different frequencies.

4. The method of claim 2, further comprising performing multiple scans of the touch sensor panel, each scan driving the rows of the touch sensor panel in a different balanced stimulation pattern.

5. The method of claim 2, further comprising balancing the one or more stimulation signals by driving a same number of rows with both the in-phase and anti-phase components of the one or more stimulation signals.

6. The method of claim 2, further comprising balancing the one or more stimulation signals by varying the number of rows driven by the in-phase and anti-phase components of the one or more stimulation signals and varying the amplitudes of the in-phase and anti-phase components of the one or more stimulation signals.

7. The method of claim 2, further comprising reducing a size of a feedback capacitor Cfb in the sense channel due to the balancing of the stimulation signals.

8. The method of claim 1, wherein the first group of rows include all of the rows in the touch sensor panel, and are simultaneously driven with a first stimulation signal of a same frequency and phase.

9. The method of claim 1, wherein one or more of the first stimulation signals are composite multi-frequency signals.

10. The method of claim 1, wherein one or more of the first stimulation signals are single-frequency signals.

11. The method of claim 1, further comprising setting the predetermined threshold to about a midpoint of a range of the first output signals of the sense channels produced between the no-touch to a full-touch condition.

12. The method of claim 1, further comprising entering an advanced power management mode and applying a sequence of stimulation signals to the rows over multiple frames and gathering data needed to determine a location of touch if it is determined that the first output signal of one or more sense channels coupled to one or more columns of the touch sensor panel exceeds a predetermined threshold.

13. An apparatus for detecting whether a touch event has occurred on a touch sensor panel, comprising:
driver logic configured for providing stimulation signals to drive rows of the touch sensor panel, the stimulation signals representing AC waveforms having one or more frequencies and one or more phases;
a plurality of sense channels configured for receiving sense signals from one or more columns of the touch sensor panel and detecting touch events on the touch sensor panel; and
auto-scan scan logic coupled to the driver logic and the plurality of sense channels, the auto-scan logic configured for
during an auto-scan cycle, and while maintaining a panel processor in a reduced power state,
periodically triggering the driver logic to simultaneously drive a first group of rows of the touch sensor panel with the one or more stimulation signals in a single scan of sense nodes on the touch sensor panel, each of the first group of rows receiving a plurality of periods of a particular stimulation signal during each scan, and coupling charge from the first group of rows into the one or more columns of the touch sensor panel,
determining whether first output signals received from one or more sense channels exceeds a predetermined threshold indicative of a change in the charge coupled into one of the columns and the occurrence of a touch event, and
when at least one of the first output signals exceeds the threshold indicative of sufficient charge coupling onto a column of the touch sensor panel to recognize the touch event, triggering a subsequent capture of second output signals from the one or more sense channels, different from the first output signals, the second output signals for determining a location of the touch event.

14. The apparatus of claim 13, the auto-scan logic further configured, during the auto-scan cycle, for:
periodically triggering the driver logic to simultaneously drive the first group of rows of the touch sensor panel with in-phase component of the one or more first stimulation signals, while simultaneously driving a second group of rows with anti-phase components of the one or more stimulation signals in a balanced manner so that in a no-touch condition, a net charge injected into each of one or more columns of the touch sensor panel is about zero.

15. The apparatus of claim 14, the one or more first stimulation signals comprising two or more stimulation signals at different frequencies.

16. The apparatus of claim 14, the auto-scan logic further configured for performing multiple scans of the touch sensor panel during the auto-scan cycle, each scan driving the rows of the touch sensor panel in a different balanced stimulation pattern.

17. The apparatus of claim 14, the auto-scan logic further configured for balancing the one or more first stimulation signals by driving a same number of rows with both the in-phase and anti-phase components of the one or more stimulation signals.

18. The apparatus of claim 14, the auto-scan logic further configured for balancing the one or more stimulation signals by varying the number of rows driven by the in-phase and anti-phase components of the one or more stimulation signals and varying the amplitudes of the in-phase and anti-phase components of the one or more stimulation signals.

19. The apparatus of claim 14, further comprising a feedback capacitor Cfb in each sense channel whose size is reduced as compared to the Cfb needed for unbalanced stimulation signals.

20. The apparatus of claim 13, wherein the first group of rows include all of the rows in the touch sensor panel, and are simultaneously driven with a first stimulation signal of a same frequency and phase.

21. The apparatus of claim 13, the driver logic further configured for providing composite multi-frequency first stimulation signals.

22. The apparatus of claim 13, the driver logic further configured for providing separate single-frequency first stimulation signals.

23. The apparatus of claim 13, the auto-scan logic further configured for detecting the touch event by determining whether the first output signal from one of the plurality of sense channels exceeds a threshold set at about a midpoint of a range of the first output signals of the sense channel produced between the no-touch to a full-touch condition.

24. The apparatus of claim 13, the auto-scan logic further configured for entering an advanced power management mode and applying a sequence of stimulation signals to the rows to over multiple frames and gathering data needed to determine a location of touch if it is determined that the first output signal of one or more sense channels coupled to one or more columns of the touch sensor panel exceeds a predetermined threshold.

25. The apparatus of claim 24, wherein the advanced power management mode is entered while keeping the panel processing in the reduced power state.

26. A computing system comprising the apparatus of claim 13.

27. A mobile telephone including an apparatus for detecting whether a touch event has occurred on a touch sensor panel, the apparatus comprising:
driver logic configured for providing stimulation signals to drive rows of the touch sensor panel, the stimulation signals representing AC waveforms having one or more frequencies and one or more phases;
a plurality of sense channels configured for receiving sense signals from one or more columns of the touch sensor panel and detecting touch events on the touch sensor panel; and
auto-scan scan logic coupled to the driver logic and the plurality of sense channels, the auto-scan logic configured for during an auto-scan cycle, and while maintaining a panel processor in a reduced power state, periodically triggering the driver logic to simultaneously drive a first group of rows of the touch sensor panel with the one or more stimulation signals in a single scan of sense nodes on the touch sensor panel, each of the first group of rows receiving a plurality of periods of a particular stimulation signal during each scan, and coupling charge from the first group of rows into the one or more columns of the touch sensor panel, determining whether first output signals received from one or more sense channels exceeds a predetermined threshold indicative of a change in the charge coupled into one of the columns and the occurrence of a touch event, and when at least one of the first output signals exceeds the threshold indicative of sufficient charge coupling onto a column of the touch sensor panel to recognize the touch event, triggering a subsequent capture of second output signals from the one or more sense channels, different from the first output signals, the second output signals for determining a location of the touch event.

28. A digital audio player including an apparatus for detecting whether a touch event has occurred on a touch sensor panel, the digital audio player comprising:

driver logic configured for providing stimulation signals to drive rows of the touch sensor panel, the stimulation signals representing AC waveforms having one or more frequencies and one or more phases;

a plurality of sense channels configured for receiving sense signals from one or more columns of the touch sensor panel and detecting touch events on the touch sensor panel; and auto-scan scan logic coupled to the driver logic and the plurality of sense channels, the auto-scan logic configured for during an auto-scan cycle, and while maintaining a panel processor in a reduced power state, periodically triggering the driver logic to simultaneously drive a first group of rows of the touch sensor panel with the one or more stimulation signals in a single scan of sense nodes on the touch sensor panel, each of the first group of rows receiving a plurality of periods of a particular stimulation signal during each scan, and coupling charge from the first group of rows into the one or more columns of the touch sensor panel, determining whether first output signals received from one or more sense channels exceeds a predetermined threshold indicative of a change in the charge coupled into one of the columns and the occurrence of a touch event, and when at least one of the first output signals exceeds the threshold indicative of sufficient charge coupling onto a column of the touch sensor panel to recognize the touch event, triggering a subsequent capture of second output signals from the one or more sense channels, different from the first output signals, the second output signals for determining a location of the touch event.

* * * * *

UNITED STATES PATENT AND TRADEMARK OFFICE
CERTIFICATE OF CORRECTION

PATENT NO. : 10,969,917 B2
APPLICATION NO. : 12/022572
DATED : April 6, 2021
INVENTOR(S) : Christoph Horst Krah and Steve Porter Hotelling It is certified that error appears in the above-identified patent and that said Letters Patent is hereby corrected as shown below:

In the Claims

In Column 15, Line 30, in Claim 13, delete "auto-scan scan" and insert --auto-scan--.

In Column 16, Line 65, in Claim 27, delete "auto-scan scan" and insert --auto-scan--.

In Column 18, Line 5, in Claim 28, delete "auto-scan scan" and insert --auto-scan--.

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*